T. R. TIMBY.
APPARATUS FOR RAISING SUNKEN BODIES.
No. 2,572. Patented Apr. 21, 1842.
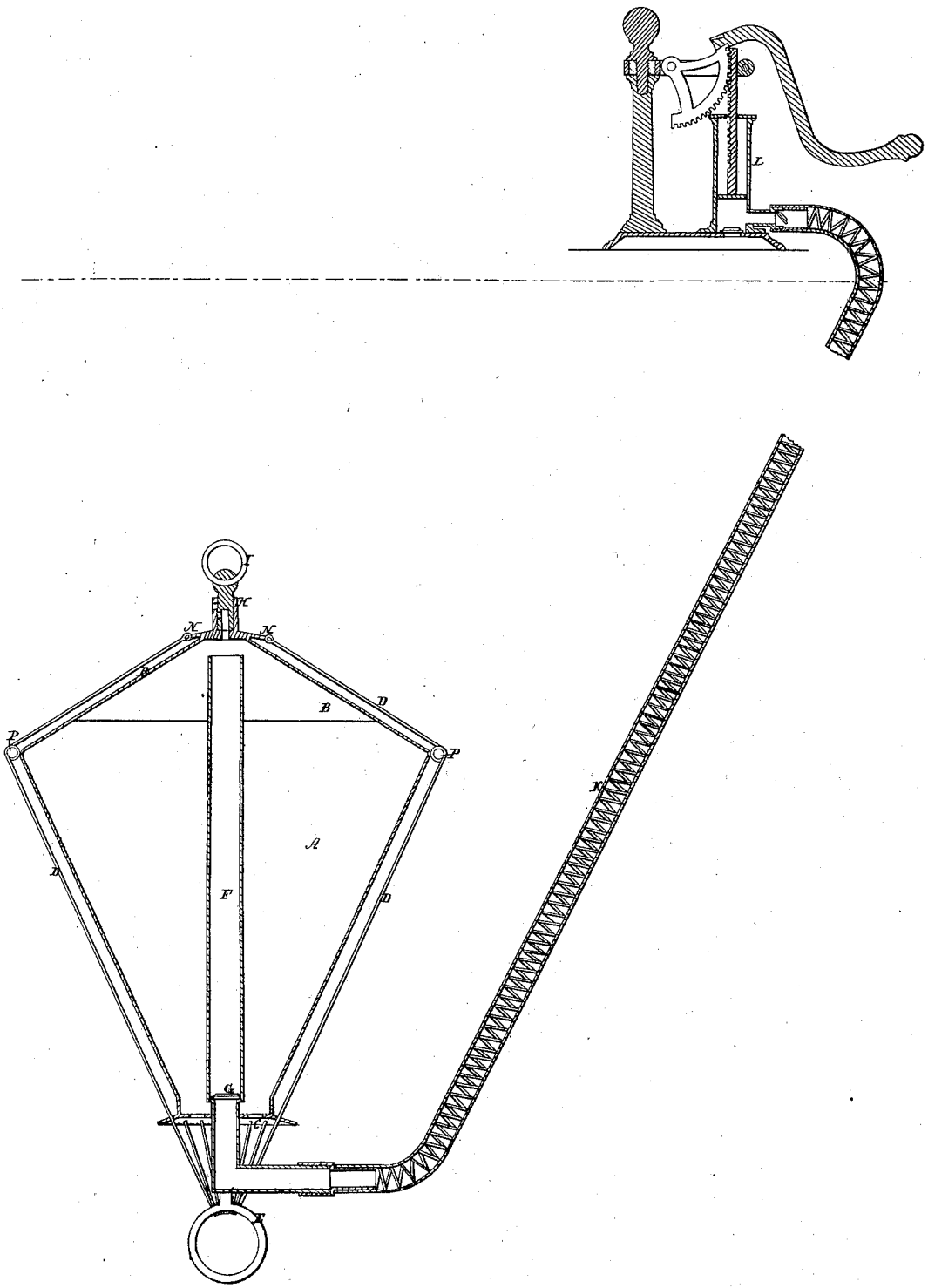

UNITED STATES PATENT OFFICE.

THEO. R. TIMBY, OF AUBURN, NEW YORK.

APPARATUS FOR RAISING SUNKEN VESSELS AND OTHER SUBMERGED BODIES.

Specification of Letters Patent No. 2,572, dated April 21, 1842.

*To all whom it may concern:*

Be it known that I, THEODORE R. TIMBY, of Auburn, Cayuga county, State of New York, have invented a new and useful Apparatus for Raising Sunken Vessels and other Submerged Bodies, which is described as follows, reference being had to the annexed drawings of the same, making part of this specification, of which—

Figure 1 is a vertical section.

This apparatus consists of a thin copper funnel shaped air vessel A with a conical or dome shaped cap or top B and a perforated bottom C across the lower or smaller diameter, surrounded on the outside by strong rods of iron or chains D passed over and around the air vessel and attached below the said air vessel to a strong ring E to which are attached the chains or fastenings secured to the boat or body to be raised. A vertical tube F is secured to the center of the air vessel reaching nearly to the top of the interior of the dome having a horizontal arm below the air vessel in which vertical part of the tube is placed a valve C, opening upward. Another valve or stop cock H is placed in the apex of the conical top or dome in which a ring I is inserted. To the outer end of the horizontal branch of the tube is attached a flexible air tight tube K leading above the surface of the water to a common air pump L to which its upper end is secured. The tube is first made of wire in a cylindrical form and then covered with leather to prevent the water collapsing the tube. The valve *b* prevents a reaction of the air against the pump. This air pump is for compressing air in the air vessel to exclude the water therefrom and cause it to lift the sunken body to which it is attached. The extension of the tube F to near the top of the dome or cap is to prevent the entrance of the water into the tube.

To raise, a ship, boat, or other heavy submerged or sunken body, let the water enter the air vessel A through the perforated partition or bottom C having previously opened the stop cock H in the dome to allow the air to escape; this will sink the air vessel to the ship to be raised; fasten them together then close the valve H in the dome and pump air into the air vessel by the air pump L. This operation will compress the air between the dome of the air vessel and the surface of the water below it and will lift the air vessel to the surface of the river, lake, or sea, or other place where the apparatus is used and with it the ship or body attached to it; the water being forced out of the air vessel through the perforated bottom C.

The chains or rods D are attached at their upper ends to strong hooks N at the apex of the dome and thence carried or wound around a circular ring P encircling the air vessel at its largest diameter and thence conveyed through the perforated bottom C to the ring E below the air vessel to which they are made fast.

I do not claim raising sunken bodies by forcing water out of a floating vessel by pumping air into it, but What I do claim is—

The peculiar funnel shape of the air vessel having a conical cap over and around which the chains or other fastenings are secured by which the air vessel is attached to the ship or body to be raised, as described, in combination with the manner of securing the chains or rods D and passing them over the ring B so as not to injure the air vessel as described.

THEODORE R. TIMBY.

Witnesses:
WM. P. ELLIOT,
E. MAHER.